United States Patent
Brindley et al.

[11] Patent Number: 6,093,454
[45] Date of Patent: Jul. 25, 2000

[54] METHOD OF PRODUCING CONTROLLED THERMAL EXPANSION COAT FOR THERMAL BARRIER COATINGS

[75] Inventors: William J. Brindley, N. Royalton; Robert A. Miller, Brecksville; Beverly J. M. Aikin, Valley View, all of Ohio

[73] Assignee: The United States of America as represented by the Administrator of the National Aeronautics and Space Administration, Washington, D.C.

[21] Appl. No.: 09/178,062

[22] Filed: Oct. 15, 1998

Related U.S. Application Data

[62] Division of application No. 08/960,309, Oct. 29, 1997, Pat. No. 5,863,668.

[51] Int. Cl.$^7$ .............................. C23C 4/06; C23C 4/08; C23C 4/10
[52] U.S. Cl. .............................. 427/456; 427/205
[58] Field of Search .................... 428/612, 633, 428/678, 615, 668, 680, 623, 632; 416/241 R, 241 B; 427/453, 454, 456, 203, 205, 191, 328, 405, 419.2; 204/181.1

[56] References Cited

U.S. PATENT DOCUMENTS

| | | | |
|---|---|---|---|
| 4,101,713 | 7/1978 | Hirsch et al. | 428/678 |
| 4,248,940 | 2/1981 | Goward et al. | 428/633 |
| 4,808,487 | 2/1989 | Gruenr | 428/660 |
| 4,966,820 | 10/1990 | Kojima et al. | 428/622 |
| 5,180,285 | 1/1993 | Lau | 428/633 |
| 5,277,936 | 1/1994 | Olson et al. | 427/453 |
| 5,305,726 | 4/1994 | Scharman et al. | 428/432 |
| 5,320,909 | 6/1994 | Scharman et al. | 428/623 |
| 5,482,830 | 1/1996 | Bogart et al. | 435/5 |
| 5,499,905 | 3/1996 | Schmitz et al. | 416/241 R |
| 5,512,382 | 4/1996 | Strangman | 425/632 |
| 5,712,050 | 1/1998 | Goldman et al. | 428/678 |

*Primary Examiner*—John J. Zimmerman
*Attorney, Agent, or Firm*—Kent N. Stone

[57] ABSTRACT

A improved thermal barrier coating and method for producing and applying such is disclosed herein. The thermal barrier coating includes a high temperature substrate, a first bond coat layer applied to the substrate of MCrAlX, and a second bond coat layer of MCrAlX with particles of a particulate dispersed throughout the MCrAlX and the preferred particulate is $Al_2O_3$. The particles of the particulate dispersed throughout the second bond coat layer preferably have a diameter of less then the height of the peaks of the second bond coat layer, or a diameter of less than 5 μm. The method of producing the second bond coat layer may either include the steps of mechanical alloying of particles throughout the second bond coat layer, attrition milling the particles of the particulate throughout the second bond coat layer, or using electrophoresis to disperse the particles throughout the second bond coat layer. In the preferred embodiment of the invention, the first bond coat layer is applied to the substrate, and then the second bond coat layer is thermally sprayed onto the first bond coat layer. Further, in a preferred embodiment of the invention, a ceramic insulating layer covers the second bond coat layer.

8 Claims, 1 Drawing Sheet

METHOD OF PRODUCING CONTROLLED THERMAL EXPANSION COAT FOR THERMAL BARRIER COATINGS

This is a divisional of application Ser. No. 08/960,309 filed on Oct. 29, 1997 now U.S. Pat. No. 5,863,668.

ORIGIN OF THE INVENTION

The invention described herein was made by employees of the U.S. Government and may be manufactured or used by or for the U.S. Government for governmental purposes without the payment of any royalties thereon or therefore.

BACKGROUND OF THE INVENTION

1. Field of Invention

This invention pertains to the art of methods and compounds for providing a thermal barrier coating, and more specifically to methods and compounds for providing a thermal barrier coating with enhanced thermal fatigue life through modification of the bond coat coefficient of thermal expansion in targeted regions of the bond coat microstructure.

2. Description of the Related Art

In the past, thermal barrier coatings included two layer coatings that consisted of a MCrAlX bond coat, wherein M=Ni, Co, or Fe and where X=a reactive element such as Y, Zr, Hf, Yb, or any other reactive element, deposited onto the substrate, and a ceramic insulating layer deposited onto the bond coat. The ceramic insulating layer was typically a zirconia based oxide ceramic, most often a zirconia partially stabilized with 6–8 weight percent yttria. The bond coat was typically 0.005–0.008 of an inch thick and the top coat was typically 0.005–0.020 inch thick. For plasma sprayed thermal barrier coatings, which the present invention specifically addresses, the bond coat was prepared with a rough surface to facilitate adhesion of the outer ceramic layer. The bond coat was required to provide oxidation resistance for the under lying substrate, as well as be oxidation resistant to prevent oxidation failure of the thermal barrier coating. The rough surface enhanced adhesion. The roughness also increased the stresses in the region of the interface between the bond coat and top coat.

The thin, two-layer coating described above works well in current applications. However, these coatings lack the thermal fatigue resistance required for future applications that require longer thermal fatigue life. While numerous modifications have been purposed for new ceramic compositions and structures, few or no proposed approaches address the primary concern for higher durability.

Alternate structures for thermal barrier coatings included "thick" thermal barrier coatings that were developed for diesel engines and outer air seals in aircraft turbines. These thick thermal barrier coats were on the order of 0.080 inch to 0.14 inch thick. The constraint developed by the high thickness of these coatings tended to generate higher thermal stresses than in a thin two-layer coating, causing coating failure of thick coatings at short life times. In order to reduce the stress concentration between the thick ceramic and the metal bond coat, these coatings were modified to "grade" the coefficient of thermal expansion of the coating through the thickness of the ceramic layer. The first layer was 100 percent MCrAlX bond coat layer, while layers two through five contained increasing amounts of yttrium-partially stabilized zirconia and decreasing amounts of MCrAlX. The coatings have also been configured in fewer discrete layers or graded continuously from the bond coat to the top layer. The effect was to gradually alter the coefficient of thermal expansion of the coating from that of the MCrAlX to that of the Yttrium-partially stabilized zirconia, thereby avoiding a high stress concentration within the ceramic layer. The concept worked well for the coatings where there was sufficient distance between the bond coat and top coat to allow for strain isolation. However, such a sufficient distance was not always available.

The disadvantages of thick, graded thermal barrier coatings described above are two-fold. The first is simply that the coatings must be thick to achieve the strain isolation as required. While the added weight of a thick coating is not a serious penalty for all applications, added coating weight is clearly a penalty for applications in the rotating parts in gas turbines, specifically aircraft turbines. The added thickness is also detrimental to the aerodynamics of a turbine blade or vane, especially the trailing edge where a thin total cross section is required. The second disadvantage of thick thermal barriers as they are currently used is that the grading includes certain amounts of isolated MCrAlX within a $ZrO_2$—$Y_2$—$O_3$ matrix at some point in the coating. If this layer of the coating is allowed to reach too high a temperature, the MCrAlX will oxidize. Oxidation of the MCrAlX can cause expansion of the ceramic-metallic (cermet) layer to such a degree that the coating is destroyed. For a thin coating for high temperature applications, there is insufficient insulation to protect the graded layer from the high temperature and attendant oxidation that will cause failure. For this reason, thick thermal barriers in high temperature applications require the outer insulating layer to be thick enough to insulate the graded layers. However, this type of coating will then become too thick and too heavy to be used in many applications as described above.

The present invention contemplates a new and improved thermal barrier coating which is simple in design, effective in use, and overcomes the foregoing difficulties and others while providing better and more advantageous overall results.

SUMMARY OF THE INVENTION

In accordance with the present invention, a new and improved thermal barrier coating is provided which provides enhanced thermal fatigue life through modification of the bond coat coefficient of thermal expansion in targeted regions of the bond coat microstructure.

In accordance with the present invention, a thermal barrier coating is disclosed for use with a high temperature substrate. The coating comprises a first bond coat layer of MCrAlX wherein M is a material selected from a group consisting of nickel, cobalt, and iron and wherein X is a material selected from a group consisting of reactive elements such as yttrium, zirconium, hafnium, and ytterbium. A second bond coat layer comprises a MCrAlX matrix wherein particles of a particulate are dispersed throughout. The second bond coat is applied to the first bond coat layer. In the second bond coat layer, M is a material selected from the group consisting of nickel, cobalt, iron and mixtures thereof, and wherein X is a material selected from a group consisting of reactive elements such as yttrium, zirconium, hafnium and ytterbium and mixtures thereof, the particulate being selected from the group consisting essentially of alumina, yttrium-aluminum-garnet, nickel-aluminum spinel, yttria, and mullite.

According to another aspect of the present invention, a method for producing a thermal barrier coating on a substrate is disclosed. The thermal barrier coating includes a first bond coat layer, and a second bond coat layer. The method includes the steps of applying the first bond coat to the substrate, providing a mixture comprising a ceramic-metallic matrix having particles of the particulate dispersed throughout the matrix for use as a second bond coat layer, and applying the second bond coat layer to the first bond coat layer.

One advantage of the present invention is that well dispersed particles assure uniform properties in the second bond coat layers.

Another advantage of the present invention is that the fine dispersion assures uniform properties of the bond coat within the critical bond coat peak region.

Another advantage of the present invention is that the fine dispersion of particles assures that properties are obtainable in a thin coating, therefore little or no weight penalty is created due to the coating.

Still other benefits and advantages of the invention will become apparent to those skilled in the art to which it pertains upon a reading and understanding of the following detailed specification.

BRIEF DESCRIPTION OF THE DRAWING

The invention may take physical form in certain parts and arrangement of parts, a preferred embodiment of which will be described in detail in this specification and illustrated in the accompanying drawing which forms a part hereof and wherein.

DESCRIPTION OF THE PREFERRED EMBODIMENT

Figure 1:
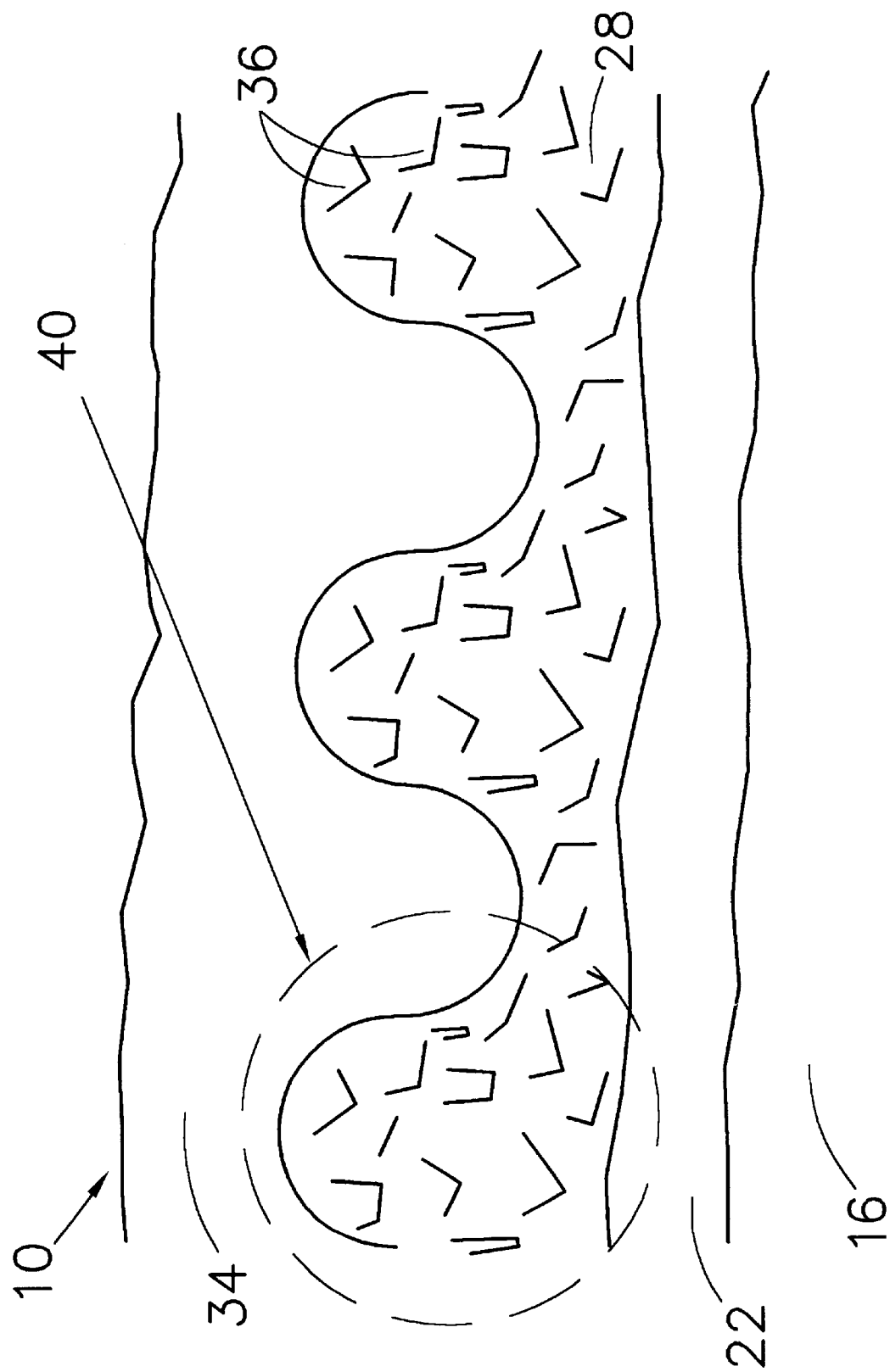
FIG. 1 is a schematic view of a controlled expansion bond coat for thermal barrier coatings according to the present invention.

Referring now to the drawing wherein the showings is for purposes of illustrating a preferred embodiment of the invention only and not for purposes of limiting the same, FIG. 1 shows a schematic view of a controlled expansion bond coat for thermal barrier coatings 10 in a preferred embodiment of the invention. The controlled expansion bond coat for thermal barrier coatings 10 includes a high temperature substrate 16, a first bond coat layer 22, a second bond coat layer 28 and a ceramic insulating layer 34. Substrate 16 is typically a super alloy, however, other alloys requiring a thermal barrier coating system may also benefit from the present invention. The first bond coat layer 22 is preferably a layer of MCrAlX, where M is either nickel, cobalt, or iron and where X is a reactive element such as yttrium, zirconium, hafnium, ytterbium, or any other suitable reactive element. The second bond coat layer 28 is a MCrAlX matrix that includes particles 36 of a particulate dispersed throughout the MCrAlX matrix. The properties of the particulate are such that the particulate must have an expansion coefficient similar to the expansion coefficient of $ZrO_2$—$Y_2O_3$ or, preferably, lower. The particulate must be chemically inert relative to the MCrAlX up to the use temperature of the coating. The particulate must have a low oxidation diffusivity. The particulate must also have thermal stability up to the use temperature. Finally, the particles 36 of the particulate should preferably be discreetly and uniformly distributed in the second bond coat layer 28. The second bond coat layer 28 preferably forms a rough coat having a roughness of 250 µin. minimum, represented by peaks 40 in FIG. 1. The particles 36 of the particulate are all uniformly distributed throughout the rough second bond coat layer 28, and therefore, must have diameters less than the size of the bond coat peaks 40, which is approximately 5 µm. The particulate is preferably selected from the group consisting essentially of alumina ($Al_2O_3$), Chromia ($Cr_2O_3$), Yttria ($Y_2O_3$), yttrium-aluminum-garnet, nickel-aluminum spinel, mullite, or any other mixture thereof which yields an oxidation resistant, inert phase with a low thermal expansion coefficient.

The volume fraction of the particulate dispersed in the metallic matrix affects the coefficient of thermal expansion of the second bond coat layer 28. Thus, the volume fraction required to achieve the effect desired in the present invention will vary depending on the actual coefficients of thermal expansion of the MCrAlX matrix, the particulate used in the mixture, and the ceramic insulating layer. The amount of particulate that can be tolerated in the metallic matrix before there is a decrease in other critical properties, such as ductility of the bond coat, also effects the volume fraction of particulate added to the matrix. The volume fraction of particulate required to achieve complete matching of the coefficient of thermal expansion can be easily calculated if the coefficient of thermal expansion of the mixture is assumed to follow a rule of mixtures.

Any method of creating a high volume fraction of finely dispersed particles 36 in the MCrAlX matrix of the second bond coat layer 28 should be capable of providing a thermal fatigue benefit. The method that has been used most often for the present invention to fabricate the particulate containing MCrAlX matrix has been thermal spray of a MCrAlX powder containing a finely dispersed alumina particulate. The powder was fabricated by attrition milling of the particulate material with an MCrAlX powder. Agglomeration processing or spray drying processing may also be used to fabricate powder suitable for thermal spraying.

Other means of introducing a second phase into the matrix are possible. In situ methods for introducing particulate to metal matrix powders may be appropriate as long as a large volume fraction of the particulate can be established.

Other means of applying a uniform deposit of powder to a substrate are possible, in addition to thermal spraying. Slurry deposition and electrophoresis are two examples of processes that may also prove capable of applying the bond coats layer 22, 28.

The following examples of the present invention are intended to be illustrative in nature only and not to be viewed as limiting or defining the scope of the invention.

EXAMPLE I

Initial studies of the present invention of a controlled expansion bond coat for thermal barrier coatings 10 used Ni-16Cr-6Al-0.3Y as the MCrAlX, and the particulate used was $Al_2O_3$. The effect of attrition milling was to create a powder consisting of a dispersion of submicron $Al_2O_3$ particles within a Ni-16Cr-6Al-0.3Y metal matrix. The powder was used for the starting material for low pressure plasma spraying of a second coat layer 28, having a micro structure similar to that for oxide dispersion strengthened alloys, but with a much high volume fraction of the particulate. In this particular example, use of a $Al_2O_3$ for the particulate requires a volume fraction of approximately 0.71 with MCrAlX to achieve a near zero mismatch of coefficients of thermal expansion between the second bond coat layer 28 and ceramic insulating layer 34. However, a significant increase in thermal barrier coating 10 life can be achieved with a controlled expansion bond coat with the volume fraction of the particulate being substantially less than 0.71. Use of NiCrAlY as the first bond coat layer 22 and NiCrAlY +Al$_2$O$_3$ as the second bond coat layer 28 showed reasonable resistance to thermal cycling damage.

The dispersion of the particles 36 of the particulate is achieved by first producing a powder consisting of MCrAlX having a low expansion phase finely dispersed therein. This powder is then thermal sprayed onto the inner first bond coat layer 22 to form the second bond coat layer 28. Thereafter, an insulating layer is then deposited on the second bond coat layer 28. The powder is preferably produced by mechanical alloying, a process where the MCrAlX is ground together with the particles 36 of the particulate to achieve a fine dispersion of the low expansion phase within each powder particle.

While Al$_2$O$_3$ was the particulate chosen in this particular example, it is believed that yttrium-aluminum-garnet, nickel-aluminum spinel, yttria, mullite and other oxides may be reasonable candidates as a second phase. Similarly, while NiCrAlY is the most common MCrAlX material used as the matrix, there are a wide range of NiCrAlY, FeCrAlY, CoCrAlY and NiCoCrAlY compositions that will meet the requirements for matrix material.

EXAMPLE II

A mixed ceramic-metallic (or cermet) bond coat has been developed and applied for two different substrates and uses. These coatings are similar in intent to the coating of the present invention. The first cermet were deposited using a mixed ceramic and metal powder to form a bond coat for a thermal barrier coating. In this case, the bond coat was prepared as a single layer and used relatively large particulate particles, i.e. greater than 5 μm. The intent was to provide gross (on the size scale of the thickness of the coating) coefficient of thermal expansion matching. Some coatings were highly successful while others that were processed identically showed no advantage over current coatings. In view of knowledge gained through the present research, it is suspected that a second phase was not uniformly distributed in the peaks of the bond coat.

Another cermet coating was developed to provide gross matching of the coefficient of thermal expansion between an oxidation resistant coating and a Ti-based substrate. There was no outer ceramic layer used in this coating. In this case, the matching of the coefficient of thermal expansion achieved a lower amount of cracking in the oxidation resistant coating then was achieved without matching of the coefficient of thermal expansion. However fatigue tests on the coated article indicated the coating caused a life debit for the substrate.

Initial tests on a two layer coating for Ti-based materials, incorporating NiCrAlY as the first layer and NiCrAlY+ Al$_2$O$_3$ as the second layer showed reasonable resistance to the thermal cycling damage. In both cases the second phase distributed within the matrix contained large particles of particulate.

EXAMPLE III

A single layer coating incorporating particulate as described above has been shown to double the life of the thermal barrier as compared to a coating without particulate. However, it is expected that a single layer particulate bond coat has less adherence than a two layer bond coat. Moreover, the need for a low expansion layer is near the interface and particularly in the bond coat peaks that constitute the roughness of the bond coat. Since the cermet powder is a more highly processed powder than MCrAlX, and therefor more expensive, it makes the most economic sense to use the cermet powder only where it is needed. For a single layer coat, the particulate must be well dispersed and fine.

While the coating of the present invention is targeted for use as a thermal barrier coating, it is expected that the invention would aid the adhesion of any coating system that has a significant expansion mismatch with the substrate, particularly if the coating is brittle. Examples of such brittle coatings are ceramics such as Al$_2$O$_3$ and carbide coatings, as well as cermets such as cemented carbides.

Further, this invention specifically addresses issues that have been identified for coatings with rough interfaces. However, thermal barriers or other ceramic coating applied to smooth surfaces may also benefit from the addition of a coefficient of thermal expansion (CTE) matched layer in the bond coat.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for producing a controlled expansion bond coat for thermal barrier coatings on an associated substrate, said thermal barrier coating consisting of a first bond coat layer of MCrAlX wherein M is a material selected from the group consisting of nickel, cobalt, iron, and mixtures thereof and wherein X is a material selected from the group consisting of yttrium, zirconium, hafnium, ytterbium, and mixtures thereof, and a second bond layer coat interfacing with said first bond coat layer consisting of a MCrAlX matrix and particles of a particulate dispersed throughout said MCrAlX matrix wherein M is a material selected from a group consisting of nickel, cobalt, iron, and mixtures thereof and wherein X is a material selected from the group consisting of yttrium, hafnium, ytterbium, and mixtures thereof, said particulate being selected from the group consisting of alumina (Al$_2$O$_3$), chromia (Cr$_2$O$_3$), yttria(Y$_2$O$_3$), yttrium-aluminum-garnet, nickel-aluminum spinel, and mullite, said second bond layer coat having an associated coefficient of thermal expansion, and a ceramic insulating layer consisting of ZrO$_2$—Y$_2$O$_3$ interfacing with said second bond coat layer, said ceramic layer having an associated coefficient of thermal expansion being substantially matched to said associated coefficient of thermal expansion of said second bond coat layer, said method consisting of the steps of:

applying said first bond coat to said associated substrate;

providing a mixture comprising said matrix having particles of said particulate dispersed throughout said matrix for use as said second bond coat layer;

applying said second bond coat layer to said first bond coat layer; and applying said ceramic insulating layer to said second bond coat.

2. The method of claim 1 wherein the step of providing a mixture comprising said matrix having particles of said particulate dispersed throughout said matrix for use as said second bond coat layer comprises the steps of:

employing mechanical methods to disperse said particulate throughout a powder comprised of of MCrAlX matrix and applying the resulting powder to said associated substrate to form a coating.

3. The method of claim 2 wherein the mechanical methods includes:

attrition milling said matrix with said particulate.

4. The method of claim 2 wherein the mechanical methods includes:

agglomeration processing said matrix with said particulate.

5. The method of claim 2 wherein the mechanical methods includes:

spray dry processing said matrix with of said particulate.

6. The method of claim 1 wherein the steps of applying said first and second bon d coat layers comprises:

using electrophoresis to deposit said first and second bond coat layers.

7. The method of claim 1 wherein the step of applying said first bond coat layer to said substrate comprises the step of:

thermal spraying said first bond coat layer onto said substrate.

8. The method of claim 1 wherein the step of applying said second bond coat layer to said first bond coat layer comprises the step of:

thermal spraying said second bond coat layer onto said first bond coat layer.

* * * * *